John A Campbell's Improvement in Railway Carriages.

73950

PATENTED
FEB 4 1868

Witnesses
John A Campbell
by his attorney

United States Patent Office.

JOHN A. CAMPBELL, OF SOUTH BOSTON, MASSACHUSETTS, ASSIGNOR TO HIMSELF AND DAVID SHARP, OF SAME PLACE.

Letters Patent No. 73,950, dated February 4, 1868.

IMPROVED CAR-BRAKE.

*The Schedule referred to in these Letters Patent and making part of the same.*

TO ALL PERSONS TO WHOM THESE PRESENTS MAY COME:

Be it known that I, JOHN A. CAMPBELL, of South Boston, in the county of Suffolk, and State of Massachusetts, have made a new and useful Improvement in Railway-Carriages; and do hereby declare the same to be fully described in the following specification, and represented in the accompanying drawings, of which—

Figure 1:
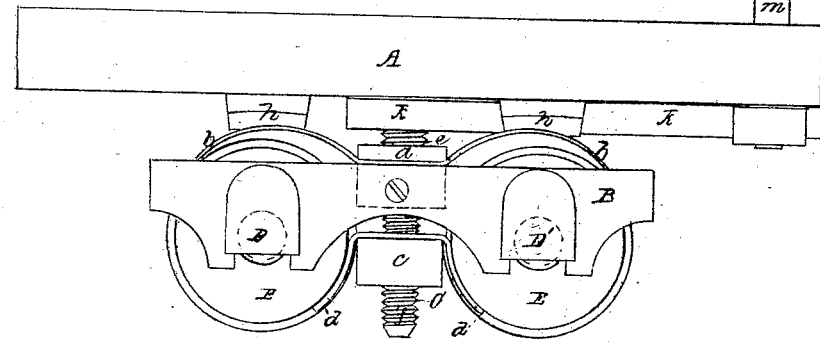
Figure 2:
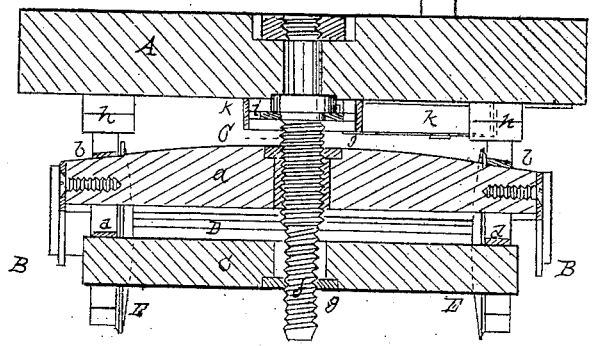

Figure 1 denotes a side elevation,

Figure 2 a transverse section, and

Figure 3:
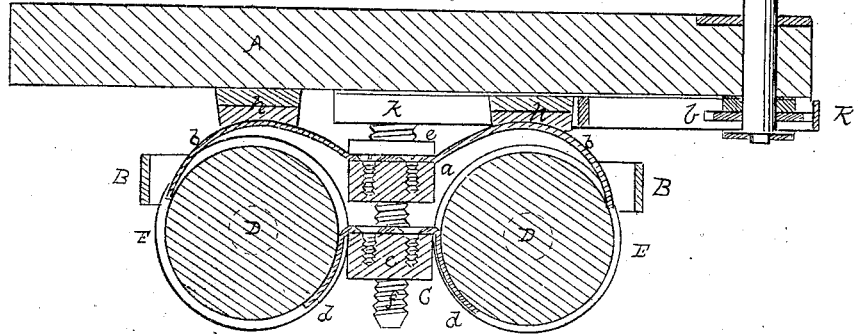

Figure 3 a longitudinal section of a railway-car truck and platform as provided with my invention, the purpose of which is either to arrest or check the motion of the carriage or car while such car may be in movement on a railway-track.

The invention in question may be styled an improved brake-mechanism.

In the drawings, A denotes the platform, B the truck-frame, and C the transom-bolt by which they are connected. The said truck-frame is supported in the ordinary manner by two axles, D D', applied to boxes or bearings arranged in such frame. Each axle has two wheels, E E. There extends from the middle cross-bar $a$ of the truck-frame a series of springs or brakes, $b\ b\ b\ b$, there being one of them to each wheel. They are arranged over and with respect to the treads or peripheries of the wheels, as exhibited in the drawings. Each of these springs has an India-rubber bearing or auxiliary spring, $h$, extending from it up to the platform A. Underneath and parallel to the cross-bar $a$ is another such bar, $c$, which supports another set of spring-brakes, $d\ d\ d\ d$, arranged between and with respect to the wheels, in manner as shown in the drawings.

The transom-bolt C has two male screws, $e\ f$, formed on it. One of them screws into and through the bar $a$, and the other screws into and through the bar $c$, there being a nut or plate, $g$, fixed to each bar to receive the screw. These screws are to be so made that, when the transom-bolt is revolved in one direction, the two bars $a\ c$ shall be caused to approach each other, and to move apart when the transom-bolt is revolved in the opposite way.

A gear, $i$, on the transom-bolt has an endless belt or chain, $k$, going around it, and another such gear, $l$, fixed on a vertical shaft, $m$, duly supported in bearings applied to the platform, and provided with a hand-wheel, $n$. By means of these devices, the transom-bolt may be revolved, so as to cause, by its screws, the two bars $a\ c$ either to approach toward or recede from each other.

In being revolved in one direction, the transom-bolt will lower the platform A, or move it toward the wheels, so as to cause the upper springs or brakes to bear upon the wheels. At the same time, the lower springs or brakes will be drawn up to the wheels. In this way, as each lower and each upper spring of a wheel bears on opposite parts of the circumference of the said wheel, the strain of the trucks will be borne by the wheel, and not by the axle. The truck-frame will be able to turn on the transom-bolt.

I do not claim applying brakes to opposite parts of a wheel, so as to relieve the axle thereof from the strain of such brakes when they are borne against the periphery of the wheel, the pressure of one brake on the wheel tending to force its axle aside, being counteracted by the pressure of the other brake, acting in an opposite direction.

I claim as my invention—

The combination as well as the arrangement of the two screws $e\ f$ of the transom-bolt C with such bolt, the bars $a\ c$, and the two series of brakes, applied to such bars and the wheels, or to the same and the platform A, substantially as described.

And, in combination therewith, I claim the hand-wheel shaft $m$, its gear $l$, and chain or belt $k$, and the gear $i$ on the transom-bolt C, the whole being arranged substantially in manner and so as to operate as described.

J. A. CAMPBELL.

Witnesses:
R. H. EDDY,
SAMUEL N. PIPER.